US010701034B2

(12) United States Patent
Mower et al.

(10) Patent No.: US 10,701,034 B2
(45) Date of Patent: *Jun. 30, 2020

(54) INTELLIGENT SORTING FOR N-WAY SECURE SPLIT TUNNEL

(71) Applicant: Extreme Networks, Inc., San Jose, CA (US)

(72) Inventors: Carl Steven Mower, Sunnyvale, CA (US); Matthew Alan Palmer, Menlo Park, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/175,680

(22) Filed: Oct. 30, 2018

(65) Prior Publication Data

US 2019/0132287 A1 May 2, 2019

Related U.S. Application Data

(63) Continuation of application No. 15/682,322, filed on Aug. 21, 2017, now Pat. No. 10,116,624, which is a
(Continued)

(51) Int. Cl.
*G06F 15/173* (2006.01)
*H04L 29/06* (2006.01)
(Continued)

(52) U.S. Cl.
CPC ...... *H04L 63/0236* (2013.01); *H04L 12/6418* (2013.01); *H04L 45/44* (2013.01);
(Continued)

(58) Field of Classification Search
CPC . H04L 63/0236; H04L 12/6418; H04L 45/44; H04L 49/70; H04L 63/0227; H04L 63/0272; H04L 63/029
(Continued)

(56) References Cited

U.S. PATENT DOCUMENTS 5,832,503 A 11/1998 Malik
5,872,928 A 2/1999 Lewis
(Continued)

*Primary Examiner* — Imad Hussain
(74) *Attorney, Agent, or Firm* — Sterne, Kessler, Goldstein & Fox P.L.L.C.

(57) ABSTRACT

A method of intelligently sorting packets/datagrams for sending through appropriate branches of a N-way split VPN tunnel according to embodiments of the present invention allow for efficient movement of network traffic to and from a remote network location. Intelligent sorting may be based on a wide range of criteria in order to implement different policies. For example, datagrams may be sorted for sending through the branches of a 3-way split tunnel so that all traffic from a remote network location ultimately destined to servers at a central location may be sent via a secure VPN tunnel, all traffic that matches a "white-list" of trusted external sites may be sent directly to and from these sites to the remote network location, and all other traffic may be redirected through a Web service that scrubs and filters the traffic to/from questionable sites. Furthermore, the VPN tunnel may be chosen to minimize latency, to detour around network failures, or to conserve energy by minimizing the number of routers a datagram passes through.

20 Claims, 1 Drawing Sheet

Related U.S. Application Data continuation of application No. 14/860,651, filed on Sep. 21, 2015, now Pat. No. 9,762,541, which is a continuation of application No. 13/849,278, filed on Mar. 22, 2013, now Pat. No. 9,143,466, which is a continuation of application No. 12/649,134, filed on Dec. 29, 2009, now Pat. No. 8,423,631.

(60) Provisional application No. 61/152,583, filed on Feb. 13, 2009.

(51) Int. Cl.
*H04L 12/64* (2006.01)
*H04L 12/721* (2013.01)
*H04L 12/931* (2013.01)

(52) U.S. Cl.
CPC ............ *H04L 49/70* (2013.01); *H04L 63/029* (2013.01); *H04L 63/0227* (2013.01); *H04L 63/0272* (2013.01)

(58) Field of Classification Search
USPC ........................................................ 709/225
See application file for complete search history.

(56) References Cited

U.S. PATENT DOCUMENTS

| | | | | |
|---|---|---|---|---|
| 7,036,143 B1* | 4/2006 | Leung | ................ | H04L 63/0272 709/227 |
| 7,131,141 B1* | 10/2006 | Blewett | ............... | H04L 63/0209 726/12 |
| 8,218,449 B2* | 7/2012 | Taylor | .................... | H04L 43/12 370/252 |
| 8,218,558 B2* | 7/2012 | Tan | .................... | H04L 12/4641 370/392 |
| 8,239,531 B1* | 8/2012 | Bellovin | ............ | H04L 63/0272 709/225 |
| 8,533,780 B2* | 9/2013 | Parla | .................... | H04L 63/102 713/153 |
| 8,560,833 B2* | 10/2013 | Kumar | ................ | H04L 63/168 709/238 |
| 9,571,457 B1* | 2/2017 | Hoy | ........................ | H04L 63/20 |
| 9,762,541 B2* | 9/2017 | Mower | ............... | H04L 12/6418 |
| 10,116,624 B2* | 10/2018 | Mower | ............... | H04L 12/6418 |
| 2003/0046397 A1* | 3/2003 | Trace | .................. | H04L 12/2856 709/227 |
| 2003/0048750 A1* | 3/2003 | Kobayashi | ............. | H04L 45/00 370/229 |
| 2003/0074429 A1 | 4/2003 | Gieseke | | |
| 2003/0224758 A1* | 12/2003 | O'Neill | ............... | H04L 12/4633 455/411 |
| 2004/0098472 A1 | 5/2004 | Styles | | |
| 2006/0056317 A1* | 3/2006 | Manning | ................. | H04L 29/06 370/254 |
| 2006/0059092 A1* | 3/2006 | Burshan | ................. | H04L 29/06 705/51 |
| 2006/0074896 A1* | 4/2006 | Thomas | ................. | G06F 21/55 |
| 2006/0075494 A1* | 4/2006 | Bertman | ............... | G06F 21/552 726/22 |
| 2006/0075501 A1* | 4/2006 | Thomas | ................ | G06F 21/566 726/24 |
| 2006/0085528 A1* | 4/2006 | Thomas | ................ | G06F 21/564 709/223 |
| 2006/0167988 A1 | 7/2006 | Barck | | |
| 2007/0061887 A1* | 3/2007 | Hoover | ............... | G06F 21/6218 726/26 |
| 2007/0097976 A1* | 5/2007 | Wood | ................... | H04L 63/1416 370/392 |
| 2007/0104197 A1* | 5/2007 | King | .................... | H04L 63/1483 370/392 |
| 2007/0143827 A1* | 6/2007 | Nicodemus | ........... | H04L 63/102 726/2 |
| 2007/0143851 A1* | 6/2007 | Nicodemus | ......... | H04L 63/1433 726/25 |
| 2009/0288157 A1* | 11/2009 | Pacella | ............... | H04L 63/1441 726/12 |
| 2009/0296604 A1 | 12/2009 | Karaoguz | | |
| 2011/0154477 A1* | 6/2011 | Parla | ................... | H04L 63/0272 726/15 |
| 2012/0005756 A1* | 1/2012 | Hoefelmeyer | ...... | H04L 63/1425 726/24 |
| 2012/0110320 A1* | 5/2012 | Kumar | ................. | H04L 63/168 713/151 |

* cited by examiner

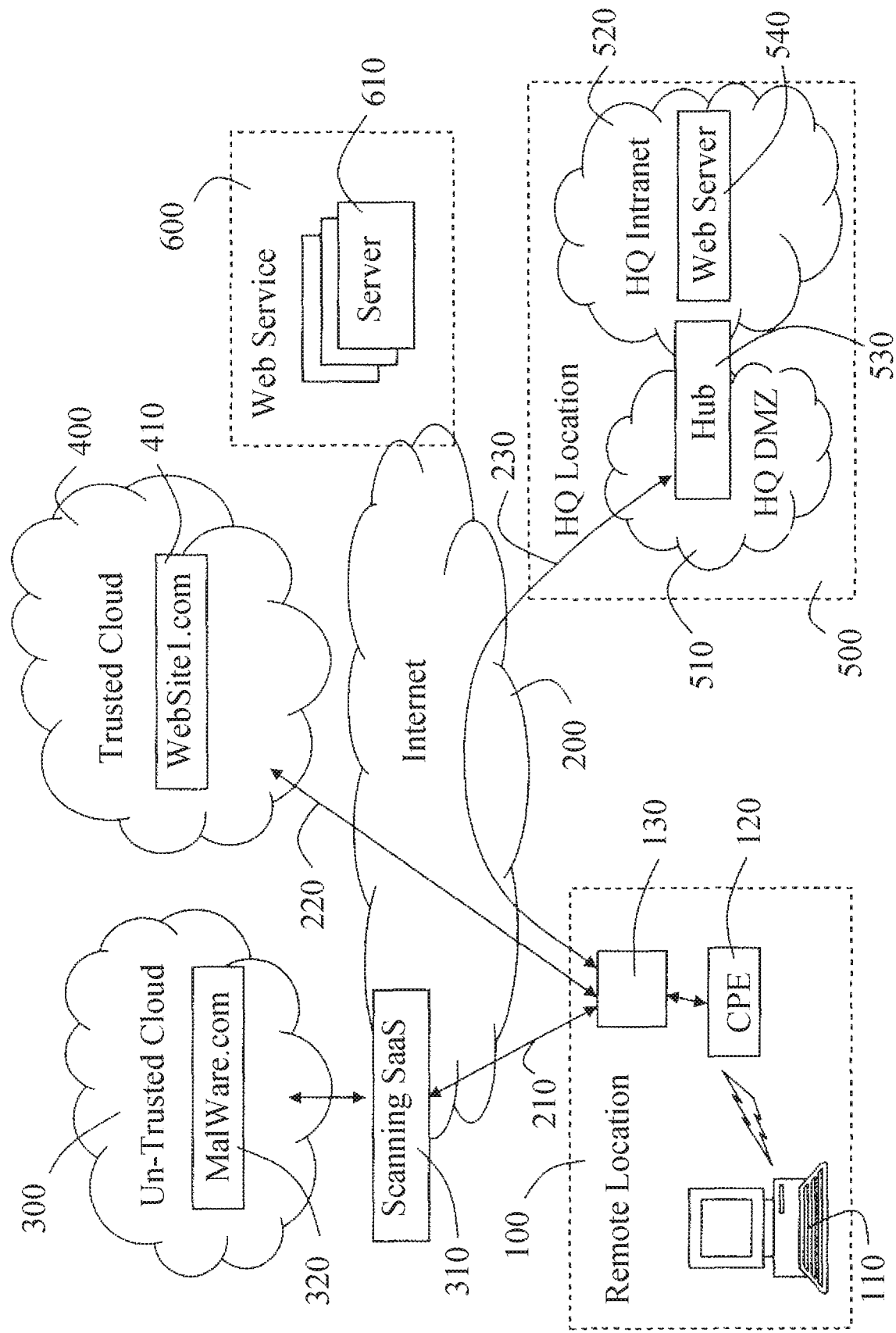

INTELLIGENT SORTING FOR N-WAY SECURE SPLIT TUNNEL

CROSS-REFERENCE TO RELATED APPLICATIONS

This application is a continuation of U.S. patent application Ser. No. 15/682,322, filed Aug. 21, 2017, which is a continuation of U.S. patent application Ser. No. 14/860,651, filed Sep. 21, 2015, now U.S. Pat. No. 9,762,541, which is a continuation of U.S. patent application Ser. No. 13/849,278, filed Mar. 22, 2013, now U.S. Pat. No. 9,143,466, which is a continuation of U.S. patent application Ser. No. 12/649,134, filed Dec. 29, 2009, now U.S. Pat. No. 8,423,631, which claims priority to U.S. Provisional Patent Application No. 61/152,583, filed Feb. 13, 2009, all of which are incorporated by reference herein.

BACKGROUND

Field of the Invention

The present invention relates generally to computer network traffic management and more specifically to intelligent sorting of datagrams for sending through appropriate branches of an N-way split virtual private network (VPN) tunnels.

Description of the Related Art

Networking devices at remote locations often create secure virtual private network (VPN) tunnels to a central location, a headquarters (HQ) location, for example. Note that a VPN is a computer network in which some of the links between nodes are carried by open or unsecured connections or virtual circuits in some larger network, such as the Internet, instead of running across a single private network. The link-layer protocols of a VPN are said to be "tunneled" through the larger network. These "tunnels" can carry all network traffic to and from the remote location through the central location—this is known as a "non-split" tunnel. Alternatively, these tunnels can carry only the traffic actually destined to servers at the central location—known as a "split" tunnel since the traffic for the broader Internet is "split" from the traffic destined specifically to the central location. Split tunnels have the advantage of offloading the central location from conveying traffic that has nothing to do with servers at that central location, but they have a big disadvantage in that client computers serviced by the remote networking device may be exposed to viruses, malware and other threats as the traffic is not "filtered" or "scrubbed" by the central location. Filtering may also include enforcement of company policies regarding which Internet sites are "off-limits", such as sites focused on violence or other objectionable material.

Companies typically either use non-split tunnels, causing a heavy load on the central location, or deploy split tunnels with relatively expensive networking devices at the remote location to perform the scrubbing and filtering.

There is a need for better solutions for handling network traffic to and from remote network locations.

BRIEF DESCRIPTION OF THE FIGURE

These and other aspects and features of the present invention will become apparent to those ordinarily skilled in the art upon review of the following description of specific embodiments of the invention in conjunction with the accompanying figures, wherein:

FIG. 1 shows a networking device for intelligent sorting of datagrams along appropriate branches of a 3-way split tunnel, according to embodiments of the invention.

DETAILED DESCRIPTION

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, embodiments of the invention are based on the concept of intelligently sorting packets/datagrams for sending through appropriate branches of a "N-way split VPN tunnel," where N is an integer greater than or equal to three. Detailed examples are provided of intelligently sorting datagrams for sending through a "3-way split VPN tunnel", where all traffic from a remote network location ultimately destined to the servers at the central location is sent via a secure VPN tunnel, all traffic that matches a "white-list" of trusted external sites is sent directly to and from these sites to the remote network location via the split tunnel, and all other traffic is redirected through a Web service that scrubs and filters the traffic to/from questionable sites. A 3-way split tunnel may allow for both enforcement of protection and policies required by an organization, while not burdening the organization's central network site with traffic not ultimately destined to servers at that central location. However, the concept of the invention, as stated above, is not limited to intelligent sorting of datagrams for sending through appropriate branches of a 3-way tunnel—the concept of the invention covers intelligent sorting for sending through N-way split tunnels, where N is an integer greater than or equal to 3. For example, embodiments of the invention may include two different services that scrub different types of network traffic—in such a case, traffic would go to one of four places via one of four branches of a split-tunnel, where the locations are: (1) a central network location; (2) directly to authorized "whitelist" locations on the Internet; (3) a first scrubbing service for scrubbing HTTP/HTTPS traffic; and (4) a second scrubbing service for scrubbing POP/IMAP/SMTP traffic. As a further variation, a first scrubbing service may scrub for viruses and malware, and a second scrubbing service may scrub for company proprietary information. Furthermore, addition of a third scrubbing service would require intelligent sorting of datagrams for sending through appropriate branches of a five-way split VPN tunnel.

Intelligent sorting of datagrams, to determine which branch of an N-way split tunnel any datagram will travel through, is done to provide protection and enforce policies. A wide range of policies may be implemented in embodiments of the present invention. Intelligent sorting may be based on a wide range of criteria in order to implement these different policies. For example, datagrams may be sorted according to whether they are addressed to destinations on a "white-list." Furthermore, the VPN tunnel may be chosen to minimize latency, to detour around network failures, or to conserve energy by minimizing the number of routers a datagram passes through. Both the intelligent sorting of datagrams and the choice of VPN tunnel are made by computer program(s) running on a computer processor at the remote network location.

An example of choosing a VPN tunnel to minimize latency is as follows. If a networking device detects the latency from a specific tunnel to be slow—say greater than 250 ms—then the networking device may fail that tunnel and send datagrams via a different route or path. For example, if the network route to a URL filtering service is greater than 250 ms via a certain VPN link, then logic programmed in the networking device directs network traffic via a different route.

An example of choosing a VPN tunnel to detour around a network failure is as follows. If an internet connection is severed—the Internet default route goes down, for example—then the networking device may be programmed to route the internet traffic via a private WAN as a secondary route. The routing via a private WAN may be implemented by using routing protocols as described herein.

An example which illustrates choosing a VPN tunnel based on multiple criteria is as follows. A branch office has a private MPLS WAN connection and an internet VPN connection. A networking device in the branch office is connected directly to the Internet connection and if a tunnel to URL filtering service became very slow (greater than 250 ms latency, for example) then the networking device may be programmed to send network traffic to that URL filtering service via the MPLS network, or first test if that link is faster and then decide which route to use based on the latency. A determination of the route to use may also be made based on the number of router hops in alternative routes, which is a reflection of the energy consumed to transmit datagrams via a particular route. Furthermore, the networking device may be programmed to use RIP or OSPF (dynamic routing protocols) to route the internet traffic over the MPLS link, should the Internet link go down.

The process of choosing a VPN tunnel as described above includes choosing the VPN tunnel according to a measured criteria, such as latency, network failures, hop count and energy usage. To be more useful, the criteria should be measured periodically—perhaps once during a time interval, where the time interval may be within the range of five seconds to one hour. An example of a typical time between measurements of a specific criteria is thirty seconds. Selection of a VPN tunnel may also account for longer term trends in measurements of a specific criteria. For example, the longer-term latency as measured over the period of one hour may be used in selecting a VPN tunnel. The periodically measured criteria may be stored in memory at the remote network location, or made available to the remote network location in order to enable calculation of longer term trends in the measurements. For example, at a particular instant in time, path 'A', via VPN tunnel 'A', may be the lower-latency route, but the longer-term trend (over 1 hr, for example) may show that latency via path 'A' is typically not the lowest and therefore should not be selected.

Furthermore, the efficacy of previous choices of VPN tunnels using any one or more of the above criteria may be monitored and used to provide input for a present choice of VPN tunnel. Ultimately, the computer processor at the remote network location selects a path and/or tunnel. Even after sending a data packet, the computer processor can continue to monitor the "paths not taken" to see, in hindsight, if a different choice may actually have been more optimal. This learning is not useful for the data packet already sent, but can be instructive when longer-term trends are used in the decision, and to test if the right criteria are being measured to make such decisions. The measurements of efficacy of previous choices of VPN tunnel may be stored in memory at the remote network location, or made available to the remote network location.

Furthermore, policies may be applied on a per end-user basis. This can be readily implemented when all of the end-user's network traffic flows through a remote networking device, since the networking device sees the end-user's authentication datagrams and can then apply an end-user specific policy for intelligent sorting at the network device. For example, 802.1X authentication may be used. An illustration of per end-user based application of a policy is as follows. End-user #1 is allowed to browse certain sites that end-user #2 on the same device cannot. This is accomplished by attaching some form of user-ID to each datagram sent to the scrubbing/filtering service and may include implementing a Web proxy on the networking device. Furthermore, the user-id can be used by the networking device to determine which tunnel to send datagrams along. For example, end user #1's datagrams are sent to McAFee for URL filtering and end-user #2's datagrams are sent to ScanSafe for URL filtering.

An example of a method for identifying an end-user using 802.1x or captive portal is provided. The 802.1x protocol specifies a very particular exchange of authentication packets, including the end-user's username. Since the remote networking device is the device passing those credentials along, including the username, the device can make an association between a given end-user/username and the unique MAC address all their packets come from. Given that association, rules can be programmed into the networking device to direct traffic differently for each different MAC (end-user device). In a similar fashion, a different authentication scheme may be used whereby the underlying network is open/unauthenticated but the end-user cannot get to Web destinations until the end-user offers a valid username/password combination at a "captive portal." (A captive portal is a Web screen that is presented to the user, regardless of the URL they enter, demanding a username/password before access to any other site is allowed). As with 802.1x, since the device collects and passes along the credentials, an association between an end-user's username and the MAC address of all datagrams coming from that end-user can be made.

Furthermore, policies implemented by intelligent sorting may be device specific. For example, network traffic to and from an iPhone may be treated differently than traffic to and from a remote computer terminal—the iPhone traffic may be sent through one branch and computer terminal traffic may be sent through other branches of an N-way split tunnel. One method for determining the type of the device is to use the first three octets of the MAC address found as the source of the packets.

FIG. 1 shows an example of a three-way split tunnel, according to embodiments of the present invention. At a remote network location 100, a workstation 110 is networked to a customer premises equipment (CPE) 120, also referred to herein as a networking device, which in turn is connected to the Internet 200 through an Internet access device 130. The workstation 110 may be any end-user computer, such as a laptop computer or a desktop computer. The workstation 110 is networked to the CPE 120, The CPE 120 comprises a computer processor and a memory device. The CPE 120 is used to manage the network at the remote network location, which includes managing the traffic of datagrams to and from the remote network location. Herein a datagram is used to refer to any and all Internet protocol transmissions, including packets and data streams. The Internet access device 130 may be a generic device which provides an interface for accessing the Internet.

In some embodiments of the invention instead of having stand-alone CPE 120 and workstation 110, the two are integrated into an end-user computer. For example, the CPE function can be provided by a card/circuit board in the end-user computer; alternatively, the CPE function may be provided by a virtual machine running on the end-user computer. For further details of virtualization of networking devices see U.S. patent application Ser. No. 12/357,362 entitled "Virtualization of Networking Services" filed Jan. 21, 2009, incorporated in its entirety by reference herein.

In FIG. 1, a network traffic split-tunnel has three branches: branch 210 to un-trusted cloud 300; branch 220 to trusted cloud 400; and branch 230 to headquarters (HQ) location 500. The HQ location 500 is shown as a central network location with an HQ DMZ 510 and an HQ intranet 520. A DMZ is a computer host or small network inserted as a "neutral zone" between a company's private network, in this case the HQ intranet 520, and the outside public network. Branch 230 ends at the network hub 530. The HQ Intranet networks a variety of resources, such as a web server 540, virtual desktop, asterisk server, IP camera and printers.

All traffic destined for the central, HQ, location 500 is sent there via a secure VPN tunnel 230. All traffic not destined for the central location 500, but matching a "white list" of trusted internet sites, described further below, is allowed to travel directly to the Internet 200 and to those sites, within the trusted cloud 400. Since sites on the white list are trusted, no scrubbing or filtering need be done to traffic to/from those locations. Additionally, sites on that list that convey sensitive data are encrypted, typically via SSL, so no incremental encryption need be performed on traffic to/from those sites. All other traffic, which will be to/from "un-trusted" locations, such as website 320, in the "un-trusted" cloud 300, is forcibly redirected to a specified destination 310 on the Internet 200 where all datagrams to/from such sites are "scrubbed" and/or "filtered" by a service offered on the Internet, (deployed in a "Software as a service (SaaS)" model). "Scrubbing" involves the detection and/or removal of viruses, Trojans, worms and other malware from streams of datagrams to/from suspect Web sites; "filtering" involves blocking datagrams to/from sites deemed to be in certain undesirable subject matter categories, such as violence and pornography.

The white list may be provided with the original software for a networking device 120. The white list may then be periodically updated from the servers 610 of a web service 600, Various methods for periodically updating software are provided in U.S. application Ser. No. 12/357,390 entitled "Networking as a service: delivering network services using remote appliances controlled via a hosted, multi-tenant management system" filed Jan. 21, 2009 and U.S. application Ser. No. 12/357,384 entitled "Decomposition of networking device configuration into versioned pieces each conditionally applied depending on external circumstances" filed on Jan. 21, 2009, both incorporated by reference in their entirety. The composition of the white list will now be discussed. A trusted website, for example WebSite1.com 410, is accessible by several, and often numerous unique IP addresses. Due to the large number of IP addresses for each trusted website, it may be undesirable to provide a white list comprising IP addresses, However, networking devices might only be able to match datagrams based on IP address. The solution to this problem would be to convey the white list to the networking device as a list of fully-qualified domain names (FQDNs). An example of a FQDN is www-.websitel.com. Each domain name system (DNS) resolution of a FQDN to a specific IP address or addresses (DNS can return multiple IP addresses for the same FQDN) is maintained in a lookup table. Since no Web access can be performed to a FQDN without first being translated to an IP address, any address used to access a given site would first be converted to an IP address using DNS. So, even though the given site's FQDN might map to dozens of IP addresses, the one, or few, IP addresses actually being used by the end-user to access that site are known to the networking device. For each datagram conveyed by the networking device, the destination IP address of that datagram is compared to the list of IP addresses currently mapped to the FQDN from the white list. If a match is found, that datagram is deemed to be part of a conversation to a trusted location. Note that an alternative implementation of the above process may be to use Internet protocol tables to find datagrams matching the criteria listed above, and to re-mark the destination, if appropriate.

Note that there are two destination addresses in a datagram. The IP datagram has a destination IP address, which is numeric, and "inside" the datagram is the URL, (which typically does contain a FQDN), which is also referred to herein as the "web address". According to embodiments of the invention, the networking device forwards the datagrams to one of the following: the hub at the HQ location; directly to the destination, if the destination IP maps to a FQDN on the white list; and to the "scrubbing" service, otherwise. This forwarding is based solely on the destination IP address; this process does not look at the web address/URL. However, alternative embodiments may utilize the web address/URL for determining how to direct datagrams. In some embodiments of the invention, the networking device may only have rules for IP addresses that were provided as a particular mapping to a FQDN associated with an access initiated with a Web-address/URL that used a FQDN and performed a DNS lookup. In the event the end-user enters an IP address for a web address/URL, it's highly likely that that IP address will not match any IP address known to the networking device from prior DNS lookups, and therefore the packet will not be proven to be white list approved, and forwarded to the scanning service by default. This means there may be some unnecessary scrubbing, but this is better than the reverse.

The two approaches for providing mapping of destination addresses by the networking device may be summarized as follows. First, the mapping from FQDN to IP addresses can be provided by the Web service. See FIG. 1. This works since the mappings for salesforce.com, for example, don't change very often. This approach has the advantage that a malicious DNS resolver cannot mislead the end-user's computer to a 'fake' salesforce.com site, known as a "phishing attack". The second approach is to specify the whitelist to the networking device as a list of FQDN, and add rules as-needed as the end-user's computer does DNS lookups for FQDN, some of which match the FQDN on the whitelist. This has the advantage of adapting quickly to changing FQDN to IP address mappings, but is susceptible to malicious DNS servers.

Further to the embodiments described above, a 3-way split tunnel may be used for communication between the central, HQ location and another branch location remote to the HQ location.

Further to the embodiments described above, intelligent sorting may also implement network quality of service (QoS)—directing network traffic according to priority. Various criteria, and combinations thereof, may be used to implement QoS, determining which tunnel to send any given datagram through, including: the latency of a tunnel; failure of some networking paths and/or components; hop count, energy usage and cost mitigation; the end-user ID; the type of device being used to connect to the network; the type of network traffic, VOIP for example; and whether a FQDN/IP address is on a whitelist. Furthermore, based on what is known about the tunnel, networking devices, users, and performance requirements, the networking device may be programmed to prioritize: certain tunnels over other tunnels; and certain datagrams from specific devices or users over those from other users, and this may change dynamically. Some examples follow. Datagrams from end-user #1 going to McAfee might be the highest priority datagrams going to McAfee—higher than datagrams from end-user #2 going to McAfee. A voice call from end-user #2 via Ring Central might have highest priority—higher priority than datagrams from end-user #1 going to McAfee. Yet another example would be if two different filtering services were used, (for example, McAfee and Scansafe), and response time to/from one of those two increased dramatically, all future un-trusted packets (those not matching destinations on the whitelist) would be automatically directed to the scanning service that still has adequate response times.

Although the present invention has been particularly described with reference to embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method, comprising:
   sending a first category of datagrams from among a plurality of categories of datagrams to a central network location along an N-way split virtual private network tunnel;
   sending a second category of datagrams from among the plurality of categories of datagrams to destinations on a white list along the N-way split virtual private network tunnel; and
   sending a third category of datagrams from among the plurality of categories of datagrams to a scanning service website along the N-way split virtual private network tunnel, the scanning service website configured to at least one of scrub or filter the third category of datagrams.

2. The method of claim 1, wherein sending the third category of datagrams to the scanning service website comprises selecting the scanning service website from among a plurality of scanning service websites based on a user identification attached to each datagram of the plurality of types of datagrams.

3. The method of claim 1, wherein N is a multiple of three.

4. The method of claim 1, further comprising determining whether to categorize a datagram in the first, second, or third category of datagrams based on a device type transmitting the datagram.

5. The method of claim 1, further comprising periodically updating the white list.

6. The method of claim 1, further comprising determining whether to sort each datagram of the plurality of datagrams based on a destination address of the datagram.

7. The method of claim 1, further comprising determining which tunnel of the N-way tunnel to send the first category of datagrams, the second category of datagrams, and the third category of datagrams through based on at least one criterion.

8. The method of claim 7, wherein the at least one criterion comprises network latency, network failures, a hop count, or energy usage.

9. A system, comprising:
   a memory storing computer instructions for sending a plurality of categories of datagrams along an N-way split virtual private network tunnel;
   a processor configured to execute the instructions, the instructions causing the processor to:
      send a first category of datagrams from among the plurality of categories of datagrams to a central network location along the N-way split virtual private network tunnel;
      send a second category of datagrams from among the plurality of categories of datagrams to destinations on a white list along the N-way split virtual private network tunnel; and
      send a third category of datagrams from among the plurality of categories of datagrams to a scanning service website along the N-way split virtual private network tunnel, the scanning service website configured to at least one of scrub or filter the third category of datagrams.

10. The system of claim 9, wherein, to send the third category of datagrams to the scanning service website, the instructions further cause the processor to select the scanning service website from among a plurality of scanning service websites based on a user identification attached to each datagram of the plurality of types of datagrams.

11. The system of claim 9, wherein N is a multiple of three.

12. The system of claim 9, wherein the instructions further cause the processor to determine whether to categorize a datagram in the first, second, or third category of datagrams based on a device type transmitting the datagram.

13. The system of claim 9, wherein the instructions further cause the processor to periodically update the white list.

14. The system of claim 9, wherein the instructions further cause the processor to determine whether to sort each datagram of the plurality of datagrams based on a destination address of the datagram.

15. The system of claim 9, wherein the instructions further cause the processor to determine which tunnel of the N-way tunnel to send the first category of datagrams, the second category of datagrams, and the third category of datagrams through based on at least one criterion.

16. The system of claim 15, wherein the at least one criterion comprises network latency, network failures, a hop count, or energy usage.

17. A non-transitory, tangible computer-readable device having instructions stored thereon for sending a plurality of categories of datagrams along an N-way split virtual private network tunnel that, when executed by at least one computing device, causes the at least one computing device to perform operations comprising:
- sending a first category of datagrams from among the plurality of categories of datagrams to a central network location along the N-way split virtual private network tunnel;
- sending a second category of datagrams from among the plurality of categories of datagrams to destinations on a white list along the N-way split virtual private network tunnel; and
- sending a third category of datagrams from among the plurality of categories of datagrams to a scanning service website along the N-way split virtual private network tunnel, the scanning service website configured to at least one of scrub or filter the third category of datagrams.

18. The device of claim 17, wherein the operations further comprise periodically updating the white list.

19. The device of claim 17, wherein the operations further comprise determining which tunnel of the N-way tunnel to send the first category of datagrams, the second category of datagrams, and the third category of datagrams through based on at least one criterion.

20. The device of claim 19, wherein the at least one criterion comprises network latency, network failures, a hop count, or energy usage.

* * * * *